United States Patent
Horch et al.

(10) Patent No.: US 12,030,372 B2
(45) Date of Patent: Jul. 9, 2024

(54) METHOD FOR OPENING AND CLOSING A VEHICLE ROOF, CORRESPONDING OPENING AND CLOSING SYSTEM AND VEHICLE

(71) Applicant: AUTOMOBILI LAMBORGHINI S.P.A., Bologna (IT)

(72) Inventors: Rudolf Horch, Korb (DE); Elena Mandosso, Bologna (IT)

(73) Assignee: AUTOMOBILI LAMBORGHINI S.P.A., Sant'Agata Bolognese (IT)

( * ) Notice: Subject to any disclaimer, the term of this patent is extended or adjusted under 35 U.S.C. 154(b) by 56 days.

(21) Appl. No.: 17/794,133

(22) PCT Filed: Dec. 28, 2020

(86) PCT No.: PCT/IB2020/062475
§ 371 (c)(1),
(2) Date: Jul. 20, 2022

(87) PCT Pub. No.: WO2021/152389
PCT Pub. Date: Aug. 5, 2021

(65) Prior Publication Data
US 2023/0052773 A1    Feb. 16, 2023

(30) Foreign Application Priority Data

Jan. 31, 2020   (IT) .................... 102020000001858

(51) Int. Cl.
*B60J 7/14*   (2006.01)
*B60J 7/02*   (2006.01)
*B60J 7/12*   (2006.01)

(52) U.S. Cl.
CPC .............. *B60J 7/148* (2013.01); *B60J 7/028* (2013.01); *B60J 7/1204* (2013.01)

(58) Field of Classification Search
CPC ........... B60J 7/028; B60J 7/1204; B60J 7/148
See application file for complete search history.

(56) References Cited

U.S. PATENT DOCUMENTS 5,979,970 A * 11/1999 Rothe ...................... B60J 7/148
                                                                    296/107.17
6,053,560 A    4/2000 Rothe
(Continued)

FOREIGN PATENT DOCUMENTS

DE   102012203234 A1   9/2013
JP   2005528269 A      9/2005

OTHER PUBLICATIONS

International Search Report and Written Opinion dated Mar. 25, 2021 from counterpart International Patent Application No. PCT/IB2020/062475.
(Continued)

*Primary Examiner* — Jason S Morrow
(74) *Attorney, Agent, or Firm* — SHUTTLEWORTH & INGERSOLL, PLC; Timothy J. Klima

(57) ABSTRACT

A method for opening and closing a retractable roof of a convertible vehicle, wherein the roof includes a first portion and a second portion, connected together. The method includes: moving the first portion relative to the second portion between a first position and a second position, such that, at the first position, the first portion is at least partly superposed on the second portion and, at the second position, the first portion lies in substantially the same plane as the second portion, rotating the first and second portions about an axis of rotation, and translating the superposed first and second portions between a first position and a second position, such that, at the first position, the first and second portions are inside a compartment in the vehicle and, at the second position, the first and second portions are outside the compartment.

16 Claims, 4 Drawing Sheets

(56) References Cited

U.S. PATENT DOCUMENTS

| | | | |
|---|---|---|---|
| 6,431,636 B1 * | 8/2002 | Schutt | B60J 7/028 296/108 |
| 6,669,201 B1 * | 12/2003 | Guillez | B60J 7/047 296/225 |
| 7,591,500 B2 * | 9/2009 | Bunsmann | B60J 7/04 296/107.18 |
| 7,703,827 B2 * | 4/2010 | Bunsmann | B60J 1/1823 296/107.07 |
| 2004/0061354 A1 | 4/2004 | Guillez et al. | |

OTHER PUBLICATIONS

Japanese Office Action dated Apr. 19, 2024 from counterpart Japanese Patent Application No. 2022544664.

* cited by examiner

METHOD FOR OPENING AND CLOSING A VEHICLE ROOF, CORRESPONDING OPENING AND CLOSING SYSTEM AND VEHICLE

This application is the National Phase of International Application PCT/IB2020/062475 filed Dec. 28, 2020 which designated the U.S.

This application claims priority to Italian Patent Application No. 102020000001858 filed Jan. 31, 2020, which application is incorporated by reference herein.

TECHNICAL FIELD

This invention relates to a method for opening and closing a roof of a convertible vehicle, for example, a super sports car, having two seats, two doors and rear engine. This description also addresses a convertible vehicle and an opening and closing system for the convertible vehicle, the system being capable of fully automatically folding and stowing the roof.

BACKGROUND ART

To date, in the field of convertible cars, retraction systems are known which are designed to fold and stow at least one rigid roof segment (retractable hard top), such as the solution disclosed in US2004061354, or to fold a frame having a length of flexible fabric attached to it (retractable soft top). The roof is customarily tucked away and stowed in a compartment behind the vehicle interior; generally, the compartment occupies part of the rear boot and extends longitudinally.

These solutions cannot, however, be applied to super sports cars with rear-engine design without significantly spoiling the style and performance of the vehicle. Indeed, in a super sports car, the space behind the vehicle interior is at least partly occupied by the engine and by devices associated therewith; the space available for accommodating the retractable roof is thus significantly reduced. It is thus particularly arduous to find a solution for vehicles of this kind, for example, on account of the space occupied by the engine, without significantly altering the vehicle's streamlined silhouette, which is a key factor in the vehicle's success.

Document DE102012203234 discloses a system for moving a vehicle roof, where the roof is divided into two parts which are superposed on each other, rotated and stowed in a compartment provided behind the seats. That way, the roof is stored in a substantially vertical position and extends longitudinally to a more limited extent than other solutions. The parts of the roof are rotated by means of an articulated quadrilateral which defines the rotation trajectory but which is in turn relatively cumbersome.

In this context, the main aim of the invention is to overcome the above-mentioned drawbacks.

AIM OF THE INVENTION

An aim of this invention is to provide a technical solution for folding and stowing a retractable roof of a convertible vehicle with significant space restrictions; for example, because the space behind the vehicle interior is limited, or because the layout of the vehicle does not allow its retractable roof to be folded and stowed in the customary ways.

An aim of this invention is to propose a system for opening and closing a vehicle roof, occupying a reduced space, both longitudinally and vertically, relative to the vehicle itself.

An aim of this invention is to propose a system and a method for opening and closing a vehicle roof and which are at once simple and reliable.

An aim of this invention is to provide a method and a system for opening a closing the roof fully automatically.

BRIEF DESCRIPTION OF THE DRAWINGS

Further features and advantages of this invention are more apparent in the following non-limiting description of one or more embodiments of the invention, as illustrated in the accompanying drawings, in which.

DETAILED DESCRIPTION OF PREFERRED EMBODIMENTS OF THE INVENTION

Figure 1:
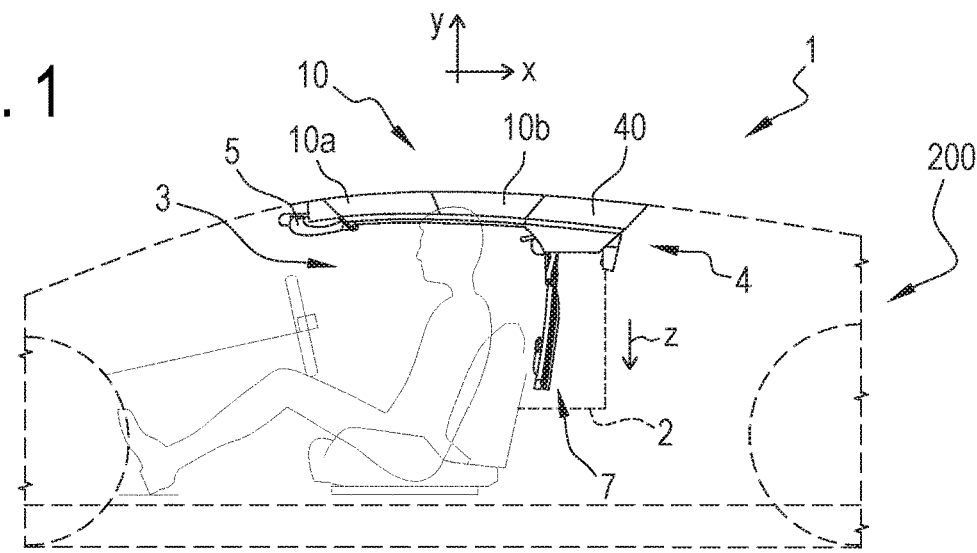
FIGS. 1 to 3 schematically illustrate a convertible vehicle provided with a system for opening and closing the roof according to one or more embodiments.
Figure 2:
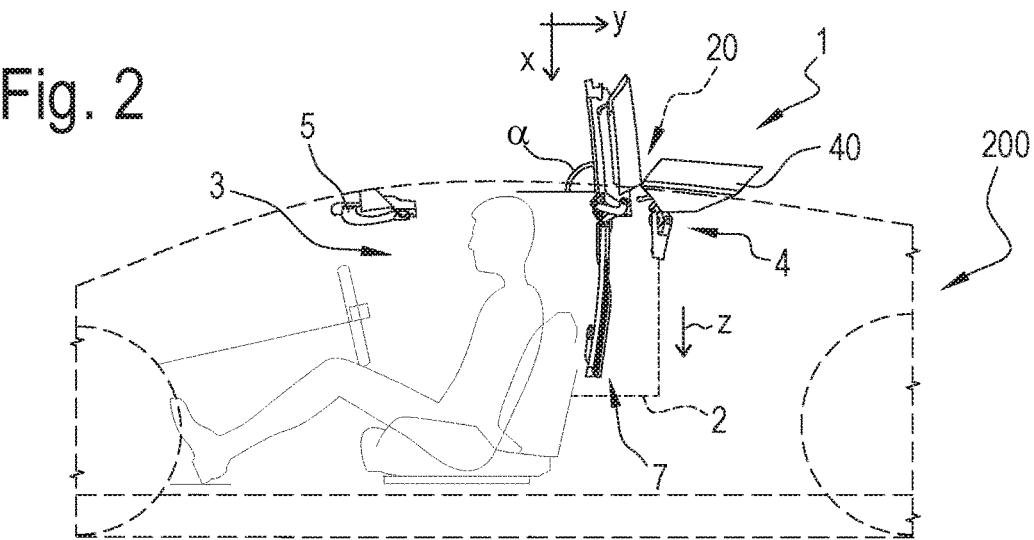
Figure 3:
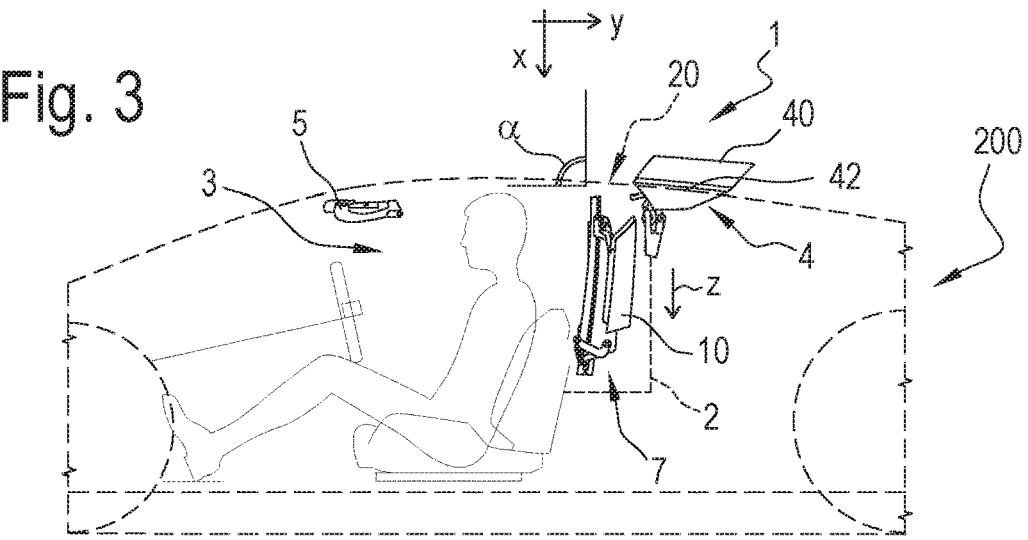

With reference to FIGS. 1 to 3, one or more embodiments may refer to a convertible vehicle 200, preferably a super sports car, comprising an opening and closing system 1 according to one or more embodiments. The opening and closing system comprises a retractable roof 10, which may be a hard or soft roof. The opening and closing system 1 allows performing the steps for opening and closing the retractable roof 10 fully automatically.

The vehicle may advantageously be a road vehicle or even a waterborne vehicle.

The vehicle 200 comprises a compartment 2 having an opening 20 such that the roof 10 can be inserted into, or extracted from, the compartment 2 through the opening 20, which may be, for example, a top opening. The compartment 2 may be inside an interior 3 of the vehicle 200, for example, behind the passenger seats.

The vehicle 200 may comprise a cover 4 having a covering element 40 for closing the compartment 2. The covering element 40 may be configured to move between a closed position, where the opening 20 is covered, and an open position, where the opening 20 is uncovered and it is possible for the roof 10 to be inserted into the compartment 2 or for the roof 10 to be extracted from the compartment 2.

In practice, the cover, or at least the covering element, is movable between the closed position, where the compartment 2 is inaccessible, and an open position, where the compartment 2 is accessible.

In one or more embodiments, the roof 10 is divided into a plurality of portions which are directly or indirectly connected to each other. For simplicity, hereinafter and in the drawings, reference is made to the case where there is a first portion 10a and a second portion 10b. A larger number of portions is also possible, however. As illustrated in the drawings, the first portion 10a may be the front portion that is further away from the compartment 2 and the second portion 10b may be the rear portion that is closer to the compartment 2. The first portion 10a and the second portion 10b may be the same size or the first portion 10a may be smaller than the second portion 10b, at least on one side of it. For example, the first portion 10a and the second portion 10b may have the same width, substantially equal to the width of the vehicle interior 3. For example, the roof 10 may be divided into the first and the second portion along a direction transverse to the vehicle 200.

The roof 10 has a dosed configuration, illustrated in FIG. 1, for example, in which the roof 10 covers the interior 3 of the vehicle 200; a transitional configuration, illustrated in FIG. 2, for example, in which the portions 10a, 10b of the roof 10 are folded/unfolded, turned and/or translated; and an open configuration, illustrated in FIG. 3, for example, in which the interior 3 of the vehicle 200 is uncovered and the roof 10 is stowed inside the compartment 2. At the open position, the first and the second portion 10a, 10b of the roof 10 are in close contact, thanks to mechanisms of the opening and closing system 1. Advantageously, this allows providing a compartment 2 of reduced size.

Advantageously, also, thanks to the presence of the cover 4 for the compartment 2, the roof 10 does not also have to cover the compartment 2 and can therefore be more reduced in length.

Thanks to its shorter length, therefore, the roof can be retracted into a compartment 2 that is less deep.

Preferably, the cover 4 also forms part of the roof opening and closing system and its operation must be coordinated at least with the movement of the roof.

In the closed configuration, the first portion 10a and the second portion 10b may lie in substantially the same plane and the first portion 10a may be latched, at the end of it opposite the end that is connected to the second portion 10b, to a safety catch and supporting element 5. In effect, the element 5 may be configured to latch onto the first portion 10b of the roof 10 when the first portion is at the element 5.

In the transitional configuration, the first portion 10a may be configured to move between a first position, where the first portion 10a is superposed on the second portion 10b, and a second position, where the first portion 10a is in substantially the same plane as the second portion 10b. The movement between the first and the second position, and vice versa, may occur by translations, for example, a first translation in a first direction X and a second translation in a second direction Y, perpendicular to the first direction. For example, the first and the second translation may occur simultaneously, which means that the first portion 10a of the roof 10 can move obliquely. For example, the first portion 10a and the second portion 10b may be superposed totally or partly.

In one embodiment—the one illustrated, for example—the front portion moves on top of the rear portion and then both are inserted into the compartment 2.

According to an aspect, the first and the second portion 10a, 10b can be rotated about an axis of rotation R10 through a predetermined angle α—for example, 90°—in one direction and in the opposite direction.

The first and the second portion 10a, 10b follow a respective circular trajectory to pass from the dosed configuration to the open configuration of the roof 10, and vice versa, about the common axis of rotation R10.

The step of opening the roof 10 comprises a step of rotating both portions 10a and 10b of the roof about the axis of rotation R10.

According to an aspect, the first and the second portion 10a, 10b which have been superposed and rotated can be stowed inside the compartment 2, or extracted from the compartment 2, by translation along a third direction Z. The third direction Z may be substantially coincident with the vertical direction. According to an aspect, the axis of rotation R10 may be perpendicular to the first direction X and/or to the second direction Y. For example, the axis of rotation R10 may be parallel to the transverse direction of the vehicle 200. The first direction X, although it is illustrated as being perpendicular to the third direction Z in FIGS. 1 to 3, changes as the rotational movement proceeds. In other words, the first direction is a direction radial to the axis of rotation R10 of the roof 10.

During the step of opening the roof 10, rotating the portions 10a and 10b of the roof about the axis of rotation R10 brings the portions 10a and 10b to the position illustrated, for example, in FIG. 2, from where they can be translated into the compartment 2.

According to an aspect, the action of moving the first portion 10a of the roof 10 relative to the second portion 10b, for example, by translating the first portion 10a along the first and the second direction X, Y, and the action of rotating the first and the second portion 10a, 10b may occur simultaneously. Advantageously, this reduces the length of time needed to open and dose the roof 10.

In the transitional configuration, when the first portion 10a and the second portion 10b are superposed and rotated and are being inserted into or extracted from the compartment 2, the cover 4 may be far from the opening 20; otherwise, the cover 4 may be in proximity to the opening 20.

In the open configuration, the first portion 10a and the second portion 10b, having been superposed and rotated, are located inside the compartment 2 and the cover 4 may be dosed to cover the opening 20.

According to an aspect, the opening and closing system 1 comprises the retractable roof 10 and at least one movement unit 12, described in more detail below.

The movement unit 12 comprises a movement and rotation mechanism, configured to move the first portion 10a of the roof 10 relative to the second portion 10b of the roof 10 between a first position and a second position, such that, at the first position, the first portion 10a is at least partly superposed on the second portion 10b and, at the second position, the first portion 10a lies in substantially the same plane as the second portion 10b, and to rotate the first portion 10a and the second portion 10b about an axis of rotation R10 which is, for example, parallel to the transverse direction of the vehicle 200.

Advantageously, compared to prior art solutions, the movement mechanism which allows rotating the portions 10a and 10b about an axis of rotation is simple, reliable and reduced in size.

The movement unit 12 comprises a translating mechanism, configured to translate the superposed first portion 10a and second portion 10b between a first position and a second position, such that, at the first position, the first portion 10a and the second portion 10b are inside a compartment 2 in the vehicle 200 and, at the second position, the first portion 10a and the second portion 10b are outside the compartment 2.

The movement unit 12 comprises a drive unit, configured to drive the movement and rotation mechanism and the translating mechanism.

Figure 4:
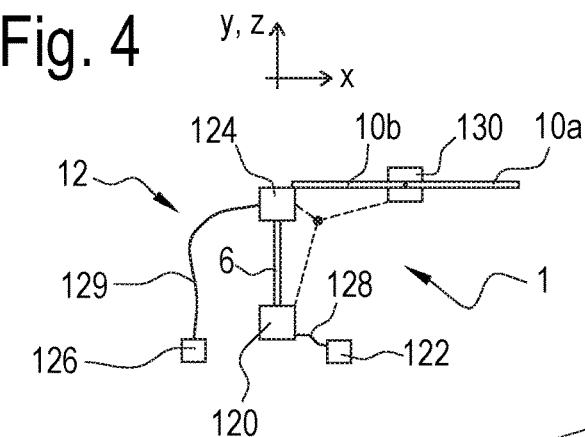
FIG. 4 is a schematic representation of an opening and closing system according to one or more embodiments.

In one or more embodiments, as illustrated in FIG. 4. the movement unit 12 may comprise one or more linkages made up of a plurality of interconnected rigid mechanical elements.

The drive unit of the movement unit 12 may comprise a first slider 120 and a first actuator 122 configured to move the first slider 120 between a first position and a second position—for example, along a third direction Z. That way, when the first actuator 122 brings the first slider 120 to the first position, the rotated first portion 10a is superposed on the rotated second portion 10b and, when the first actuator 122 brings the first slider 120 to the second position, the first portion 10a is in substantially the same plane as the second portion 10b.

The drive unit of the movement unit 12 may comprise a second slider 124 and a second actuator 126 configured to move the second slider 124 between a first position and a second position for example, along a third direction Z. That way, when the second slider 124 is at the first position, the roof 10 is housed inside the compartment 2 and when the second slider 124 is at the second position, the roof 10 is outside the compartment 2. The second slider 124 may be connected (for example, directly) to the second portion 10b of the roof 10.

The system 1 may comprise a rail 6, along which the first slider 120 and/or the second slider 124 can run. The rail 6 is fixed to the vehicle 200 for example, behind the seats.

In one or more embodiments, the second position of the first slider 120 may consist in the first slider 120 being far from the second slider 124. On the contrary, the first slider 120 is at the first position when it is close to the second slider 124.

According to an aspect, the first slider 120 may comprise an engagement mechanism 121, configured to engage the second slider 124 if the first slider 120 is at the first position. For example, the second slider 124 may be configured to be translated only if the first slider 120 is coupled to the second slider 124. Thus, when the second actuator 126 moves the second slider 124, the first slider 120 is also moved. The first slider 120 may be configured to be engaged with the second slider 124 when it is at the first position and to be disengaged from the second slider 124 before the first slider 120 starts moving towards the second position.

According to an aspect, the drive unit of the movement unit may comprise at least one first entraining element 128—for example, a belt, a rack or a cable—for connecting the first slider 120 to the first actuator 122, where the first actuator 122 may be configured to move the first slider 120 by moving the first entraining element 128, for example, by pulling the cable. For example, the first slider 120 and the first actuator 122 may be connected by two cables: one cable to allow moving the first slider 120 from the first position to the second position, and one cable to allow moving the first slider 120 from the second position to the first position. The drive unit of the movement unit may comprise at least one second entraining element 129—for example, a belt, a rack or a cable—for connecting the second slider 124 to the second actuator 126, where the second actuator 126 may be configured to move the second slider 124 by moving the second entraining element 129, for example, by pulling the second cable. For example, the second slider 124 and the second actuator 126 may be connected by two cables: one cable to allow moving the second slider 124 from the first position to the second position, and one cable to allow moving the second slider 124 from the second position to the first position.

According to an aspect, the first actuator 122 and the second actuator 126 may be electric motors configured for driving the first entraining element 128 and the second entraining element 129.

In one or more embodiments, the drive unit may comprise a linear motor, configured for driving the first and the second slider 120, 124 between the first and the second position.

Alternatively, the drive unit may comprise a hydraulic actuator, for example, hydraulic cylinders.

In one or more embodiments, the movement and rotation mechanism comprises a connecting mechanism 130—for example, an articulated quadrilateral—configured for linking the first portion 10a and the second portion 10b of the roof 10 to each other. The connecting mechanism 130 may be configured to move the first portion 10a by translation relative to the second portion 10b of the roof 10.

Figure 5:
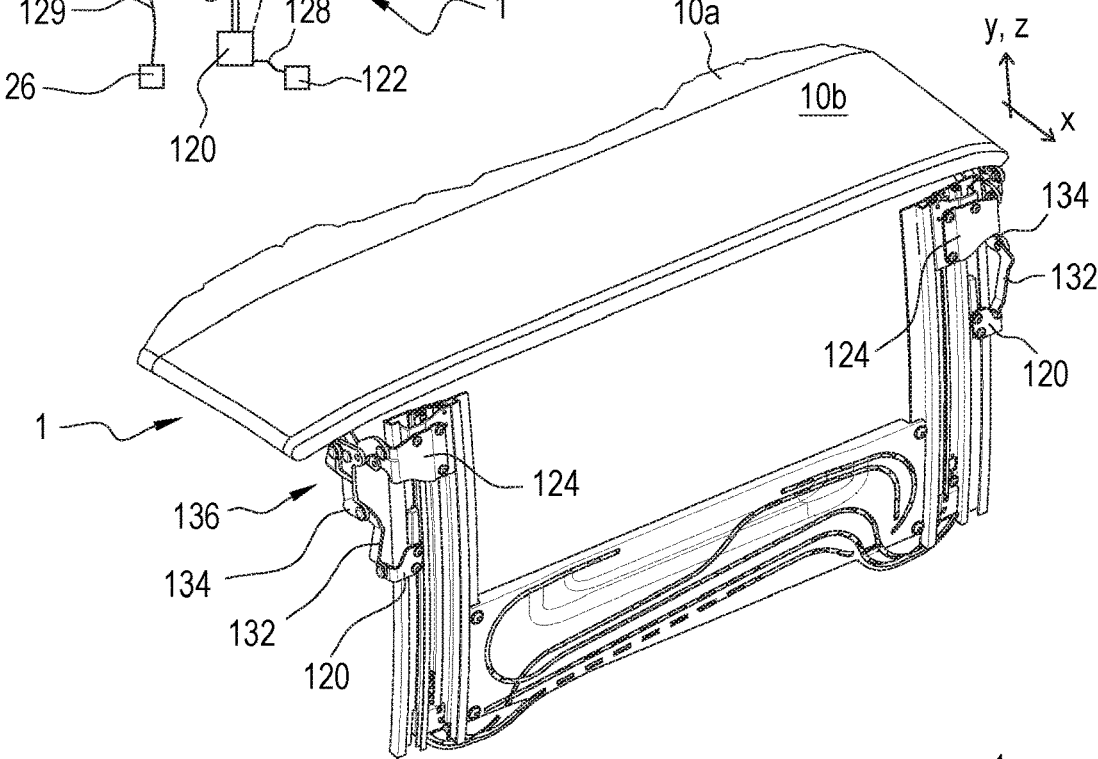
FIGS. 5 to 9 show details of an example of an opening and closing system according to one or more embodiments.
Figure 6:
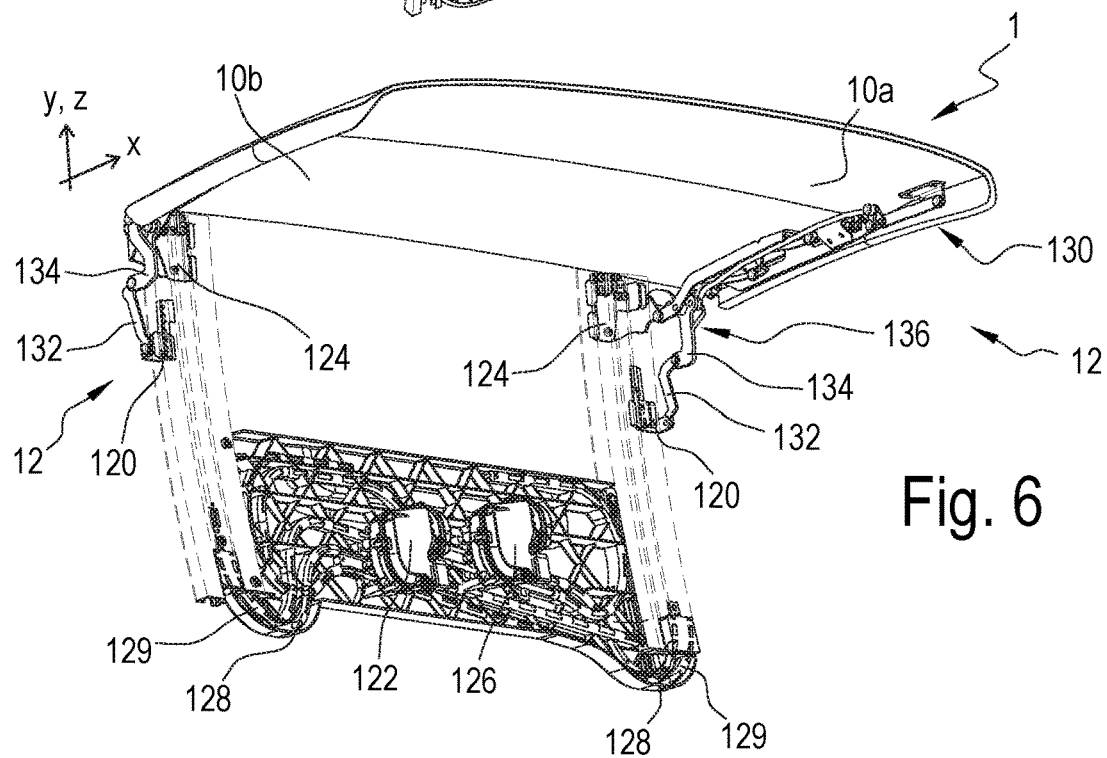

FIGS. 5 to 6 show views from the front and from the back of an example of an opening and closing system 1 according to one or more embodiments where the roof 10 is closed. At one or both lateral ends of the roof 10, the system 1 may comprise a movement unit 12 as described with reference to FIG. 4. As illustrated in FIGS. 5 and 6, the system 1 may comprise two movement units 12. The vehicle 200 comprises a frame or structure, preferably load-bearing, denoted in its entirety by the reference numeral 7.

The roof 10 is supported by the frame 7 and, more specifically, one end of the roof 10 is connected to the frame 7. More precisely, the roof 10 may be connected to the frame 7 at one end of the second portion 10b, opposite to the end that is connected to the first portion 10a.

The system 1 may comprise two rails 6, located at lateral ends of the frame 7. The first and the second slider 120, 124 of the two movement units 12 may be configured to be moved by translation along the respective rail 6, The first and the second actuator 122, 126 of the two movement units 12 may be located at the frame 7. The two movement units 12 are configured to be activated and to move the portions 10a. 10b of the roof 10 simultaneously.

Figure 7:
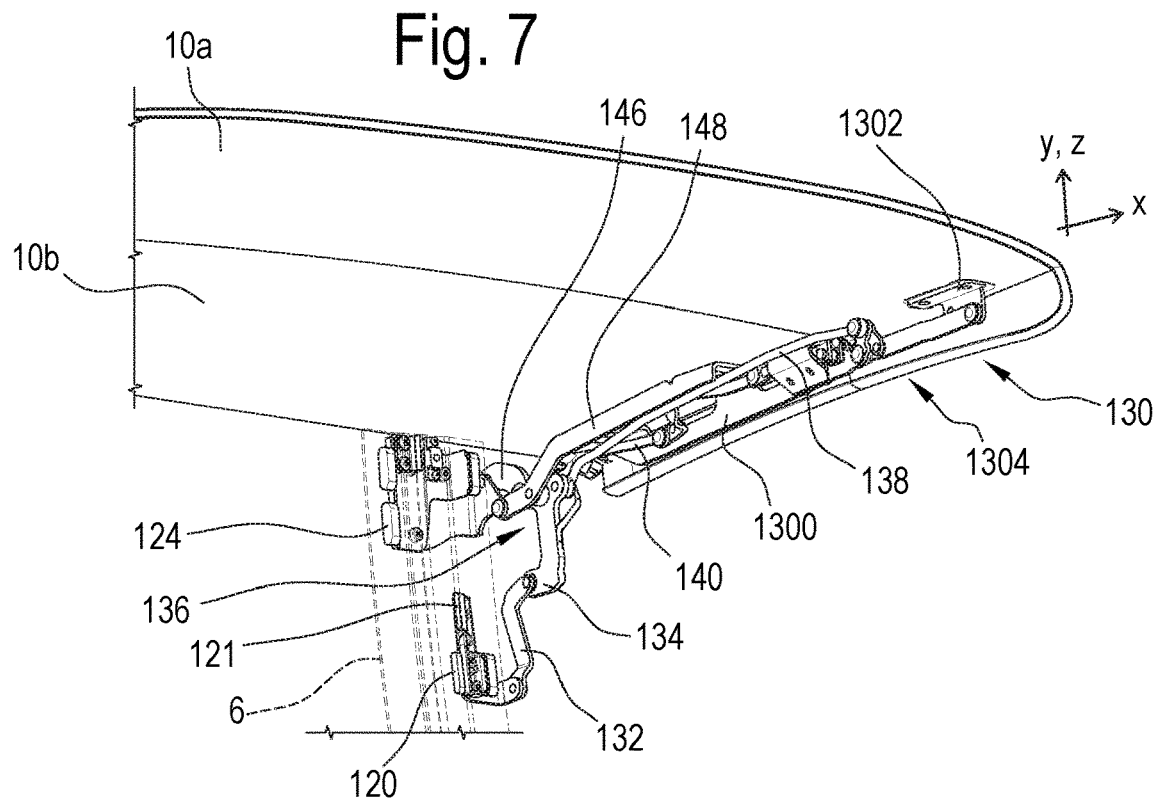
Figure 8:
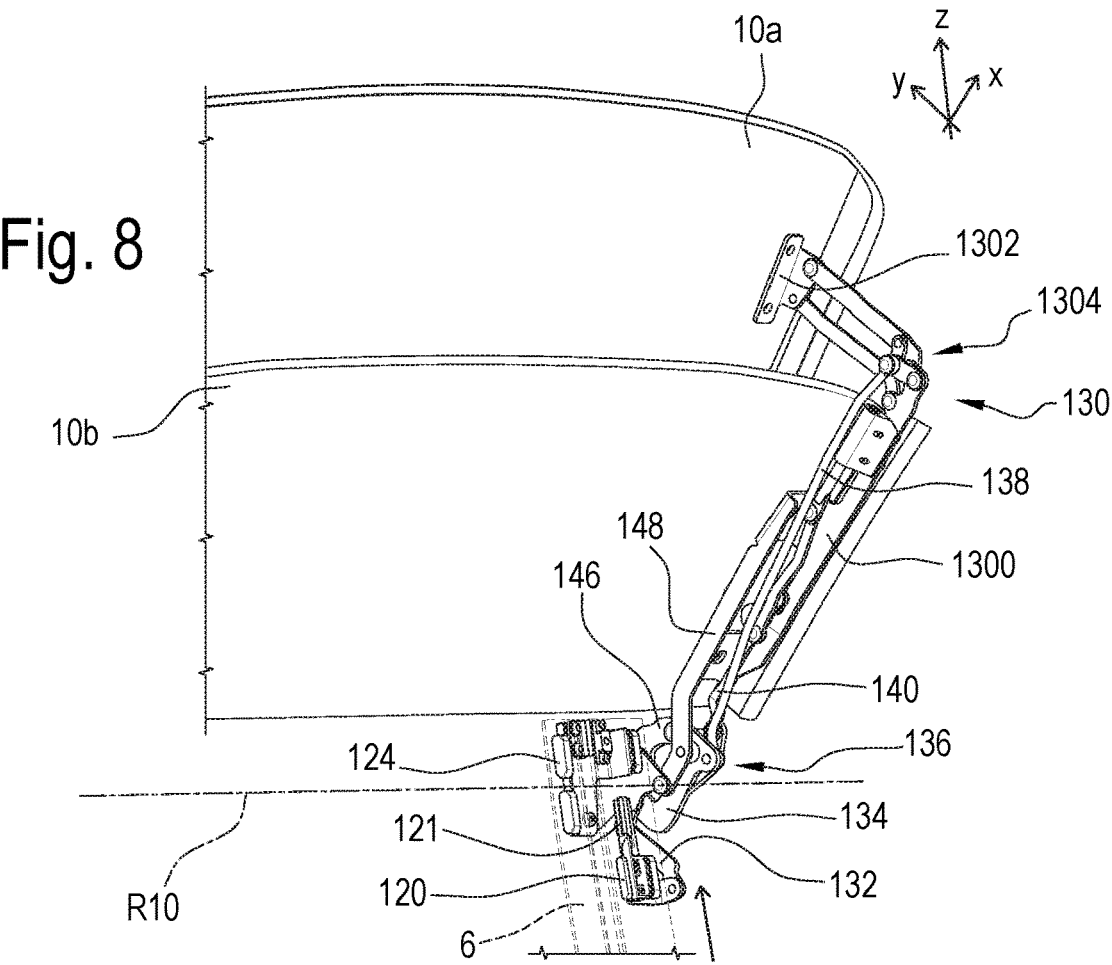
Figure 9:
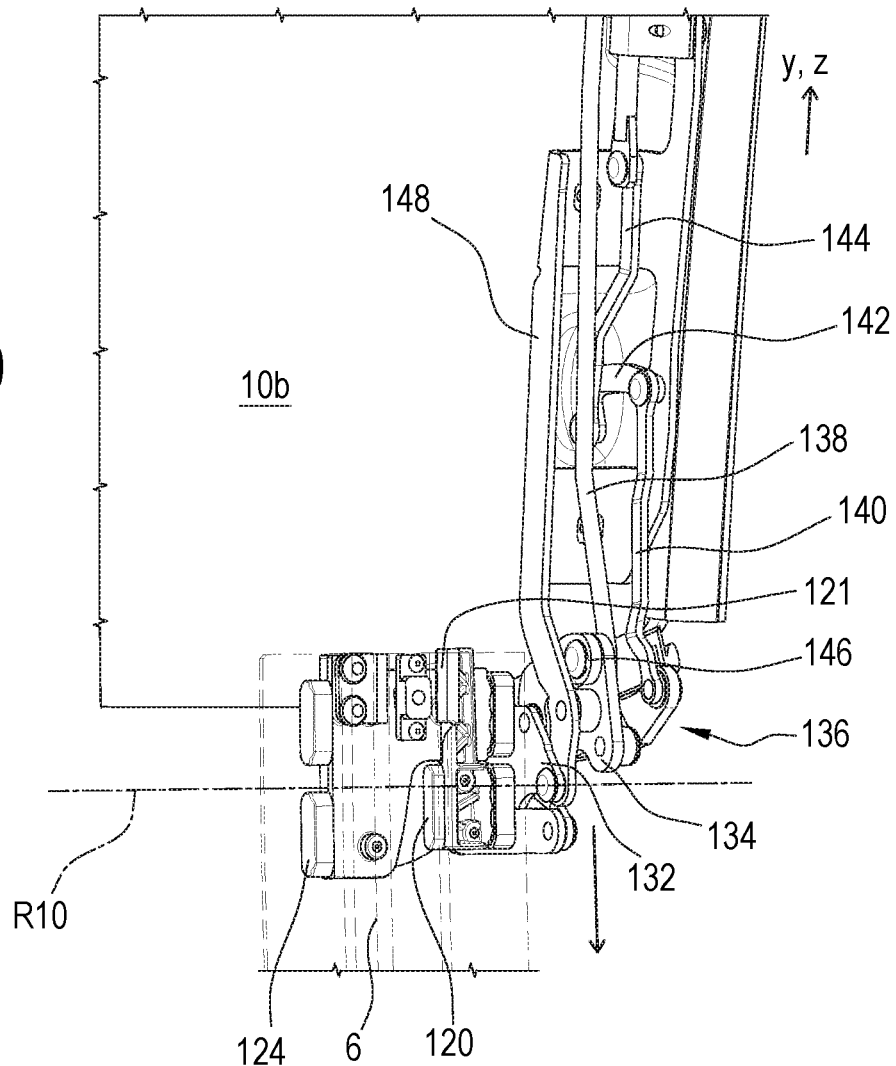

FIGS. 7 to 9 illustrate an example of how a roof 10 in the closed configuration (FIG. 7) and in the transitional configuration (FIGS. 8 and 9) is opened. As already discussed, the system 1 may comprise a plurality of levers and links. Driving the first slider 120 and the second slider 124 can in turn drive the plurality of levers.

As illustrated in FIG. 8, the first slider 120 may be connected to one end of a conrod 132 which is connected, at the opposite end, to a crank 134. The crank 134 is in turn connected to a link 136 at the end opposite to the end that is connected to the conrod 132. Through the link 136, the crank 134 is connected to the articulated quadrilateral 130, which comprises: a rigid element 1300 which is fixed to the second portion 10b of the roof 10 and connected at one end to the link 136; an arm 1302 fixed to the first portion 10a of the roof 10; and arms 1304, which are located between the rigid element 1300 and the second rigid element 1302 and which are connected thereto, The arms 1304 are configured to allow the first portion 10a to be moved by translation relative to the second portion 10b of the roof 10 in known manner. The arms 1304 of the articulated quadrilateral 130 are connected to the link 136 by a lever 138 by which they can be driven. The rigid element 1300 is also connected to the link 136 by levers 140, 142, 144. The second slider 124 is connected to the link 136 by a member 146.

The second slider 124 is connected to the link 136 and to the second portion 10b of the roof 10 by a lever 148.

The roof portion 10b is linked to the slider 124 by the lever 148.

As illustrated in the drawings, when the first slider 120 is driven, for example, the cable 128 is pulled and the first slider 120 moves translationally towards the first position, for example vertically upwards. The movement of the first slider 120 triggers the movement of the conrod 132 and of the crank 134 which, through the link 136 and the lever 138, drives the first portion 10a of the roof 10 translationally along the first direction X. Through the link 136, the conrod 132 and the crank 134 move the rigid element 1300, the member 146 and the lever 148 which act in conjunction to rotate the first and the second portion 10a and the second portion 10b of the roof 10. For example, the predetermined angle a may be a 90° angle and, after rotating, the first portion 10a and the second portion 10b are parallel to the third direction Z. After being rotated and superposed, the portions 10a, 10b of the roof 10 are held in position by the mechanisms of the system 1. For example, the levers 140, 142, 144 hold the movable parts of the articulated quadrilateral 130 in position when the first portion 10a is superposed on the second portion 10b.

FIG. 9 shows the first slider 120 at the first position at the end of the translational movement. When it is at the first position, the first slider 120 is in contact with, and coupled to, the second slider 124.

That way, when the second slider 124 is driven and moved translationally, the first slider 120 also moves translationally along with the second slider 124.

When the second slider 124, hence the first slider 120, moves translationally along the third, vertical direction Z, for example, downwards, the mechanisms coupled to the first and second sliders 120, 124 are also entrained with them along the third direction Z. Thus, the roof 10 is moved translationally along the third direction Z, for example, towards the compartment 2 that receives it.

Figure 10:
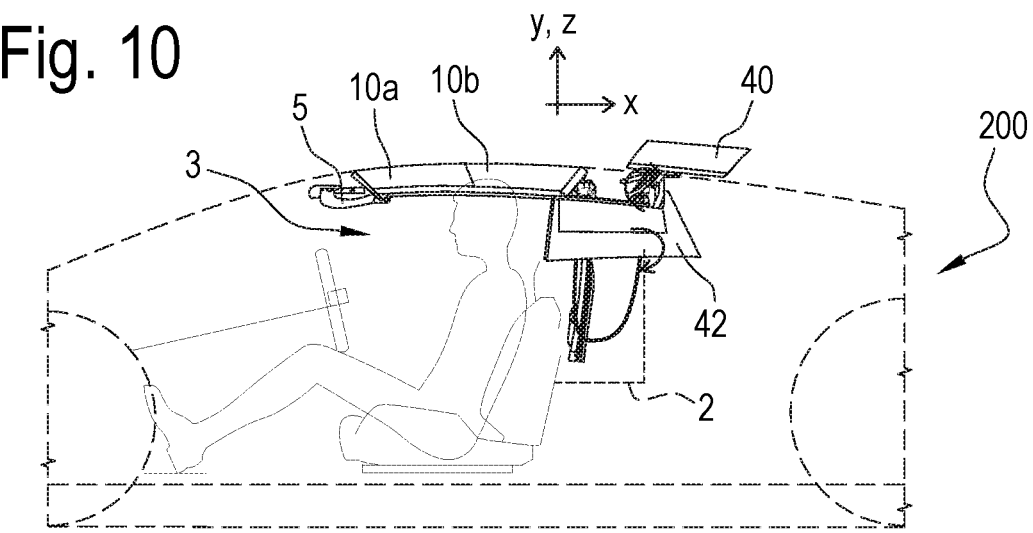
FIG. 10 schematically illustrates a convertible vehicle provided with a system for opening and closing the roof according to one or more embodiments.

What has been described up to here with reference to FIGS. 7 to 9 is a non limiting example of how the roof 10 is opened. Closing occurs in the same way but by translational and rotational movements in opposite directions to those described above, In one or more embodiments, as illustrated in FIG. 10, the openable cover 4 may have side walls 42 and the covering element 40, located between the side walls 42 and configured to close the opening 20 of the compartment 2.

According to an aspect, the covering element 40 may be smaller in width than the first and the second portion 10a and 10b of the roof 10: that is to say, the opening 20 may be less wide than the vehicle interior 3, for example, because the side walls 42 of the cover 4 are inclined towards the inside of the vehicle for aesthetic and/or vehicle performance reasons.

The covering element 40 may be configured to move translationally between a first position, where the covering element 40 is far from the opening 20, and a second position, where the covering element 40 is at the opening 20.

The side walls 42 may be configured to be moved by translation rigidly with the covering element 40. For example, the cover 4 may be made as a single part, as illustrated, for example, in FIG. 3. Alternatively, the side walls 42 may be configured to rotate at least partly, as illustrated in FIG. 10, away from the inside of the compartment 2 to uncover the opening 20, or towards the inside of the compartment 2 to cover the opening 20. The side walls 42 may be configured to rotate in opposite directions during opening and/or closing of the cover 4.

The covering element 40 and the side walls 42 may be far from the opening 20 when the roof 10 is being inserted or extracted, while they may be at the opening 20 otherwise.

The opening and closing of the opening 20, hence the movement of the cover 4, may be fully automated. The vehicle 200 may comprise a lifting mechanism comprising an electric motor at one or both lateral ends of the covering element 40.

According to an aspect, the side walls 42 may be activated by a spring and a Bowden system, for example, connected to the lifting mechanism for lifting the covering element 40. Alternatively, the side walls 42 may be activated by at least one independent electric motor.

One or more embodiments may refer to a method for opening and closing a retractable roof 10 of a convertible vehicle, where the roof is made up at least of a first portion 10a and a second portion 10b. The method comprises:

moving the first portion 10a of the roof 10 relative to the second portion 10b of the roof 10 between a first position and a second position, such that, at the first position, the first portion 10a is at least partly superposed on the second portion 10b and, at the second position, the first portion 10a lies in substantially the same plane as the second portion 10b, rotating the first portion 10a and the second portion 10b about an axis of rotation R10, and translating the superposed first portion 10a and second portion 10b between a first position and a second position, such that, at the first position, the first portion 10a and the second portion 10b are inside a compartment 2 in the vehicle and, at the second position, the first portion 10a and the second portion 10b are outside the compartment 2.

For example, to open the roof 10, the method may comprise moving the first portion 10a of the roof 10 by translation relative to the second portion 10b along the first and the second direction X, Y towards the first position, rotating the first portion 10a and the second portion 10b of the roof 10 through a predetermined angle a, for example, 90°, in a first direction, and translationally moving the first portion 10a and the second portion 10b, which are superposed and rotated, along the third direction Z towards the first position.

For example, to close the roof 10, the method may comprise translationally moving the first portion 10a and the second portion 10b, which are superposed and rotated, along the third direction Z towards the second position, rotating the first portion 10a and the second portion 10b of the roof 10 through the predetermined angle α, for example, −90°, in the opposite direction and moving the first portion 10a of the roof 10 by translation relative to the second portion 10b along the first and the second direction X, Y towards the second position.

According to an aspect, the step of moving the first portion 10a of the roof 10 relative to the second portion 10b of the roof and the step of rotating the first portion 10a and the second portion 10b occur simultaneously.

According to an aspect, the step of translating the first portion 10a and the second portion 10b, which are superposed and rotated, for example, along the third direction Z, occurs at a different time to the other steps, for example, after the step of rotating, while the roof 10 is being opened, or before the step of rotating, while the roof 10 is being closed.

In one or more embodiments, the vehicle may comprise at least one cover 4 for closing the compartment 2 and the method may comprise opening or closing the compartment 2 by moving the cover 4.

In one or more embodiments, the cover 4 has side walls 42 and a covering element 40 between the side walls 42, where, for example, the covering element 40 may be smaller in width than the first portion 10a and the second portion 10b of the roof 10. The method may comprise the following steps, performed during insertion and extraction of the first portion 10a and the second portion 10b of the roof 10, which have been superposed and rotated:

moving the covering element 40 between a first position, where the opening 20 is uncovered, and a second position, where the opening 20 is covered, and moving the side walls 42 rigidly with the covering element 40 or at least partly rotating the side walls 42 away from or towards the covering element 40 to uncover or cover the opening 20, respectively.

The invention claimed is:

1. A method for opening and closing a retractable roof of a convertible vehicle, wherein the roof includes a first portion and a second portion, connected to each other, the method comprising the following steps:

moving the first portion of the roof relative to the second portion of the roof between a first position and a second position, such that, at the first position, the first portion is at least partly superposed on the second portion and, at the second position, the first portion lies in substantially a same plane as the second portion, rotating the first portion and the second portion via a movement and rotation mechanism, and translating, via a translating mechanism separate from the movement and rotation mechanism and configured to provide a uniform motion in a generally straight line, the first portion and the second portion, which have been superposed and rotated, between a third position and a fourth position, such that, at the third position, the first portion and the second portion are inside a compartment in the vehicle and, at the fourth position, the first portion and the second portion are outside the compartment, wherein the step of rotating occurs by rotating the first portion and the second portion about a common axis of rotation.

2. The method according to claim 1, wherein the step of moving the first portion of the roof relative to the second portion of the roof and the step of rotating the first portion and the second portion occur simultaneously.

3. The method according to claim 1, wherein the step of translating the superposed first portion and second portion occurs after the step of rotating, while the roof is being opened, or occurs before the step of rotating, while the roof is being closed.

4. The method according to claim 1, wherein the vehicle comprises a cover for closing the compartment and wherein the method comprises opening and/or closing the compartment by moving the cover.

5. The method according to claim 4, wherein the cover comprises side walls and a covering element between the side walls and wherein the method comprises:

moving the covering element between an uncovered position, where the opening is uncovered, and a covered position, where the opening is covered, and moving the side walls rigidly with the covering element or at least partly rotating the side walls away from or towards the covering element to uncover or cover the opening, respectively.

6. The method according to claim 1, wherein the first portion is a front portion of the roof and the second portion is a rear portion of the roof, the first portion being placed on top of the second portion after the step of moving the first portion of the roof relative to the second portion of the roof.

7. An opening and closing system configured for opening and closing a convertible vehicle, the opening and closing system comprising:

a retractable roof including a first portion and a second portion, connected to each other, and at least one movement unit for moving the retractable roof, the at least one movement unit comprising:

a movement and rotation mechanism, configured to move the first portion of the roof relative to the second portion of the roof between a first position and a second position, such that, at the first position, the first portion is at least partly superposed on the second portion and, at the second position, the first portion lies in substantially the same plane as the second portion, and to rotate the first portion and the second portion, a translating mechanism, separate from the movement and rotation mechanism and configured to translate, via a uniform motion in a generally straight line, the superposed first portion and second portion between a third position and a fourth position, such that, at the third position, the first portion and the second portion are inside a compartment in the vehicle and, at the fourth position, the first portion and the second portion are outside the compartment, and a drive unit, configured to drive the movement and rotation mechanism and the translating mechanism, wherein the movement mechanism comprises a common axis of rotation about which the superposed first portion and second portion are rotated.

8. The opening and closing system according to claim 7, wherein the at least one movement unit comprises at least one linkage mechanism, including a plurality of interconnected mechanical elements.

9. The opening and closing system according to claim 7, wherein the drive unit of the at least one movement unit comprises a first slider and a first actuator configured to move the first slider between a fifth position and a sixth position, such that when the first slider is at the fifth position, the rotated first portion is superposed on the second rotated portion and when the first slider is at the sixth position, the first portion lies in substantially the same plane as the second portion.

10. The opening and closing system according to claim 9, wherein the drive unit of the at least one movement unit comprises a second slider and a second actuator configured to move the second slider between a seventh position and an eighth position, such that when the second slider is at the seventh position, the roof is housed inside the compartment and when the second slider is at the eighth position, the roof is outside the compartment.

11. The opening and closing system according to claim 10, wherein the first slider comprises an engagement mechanism, configured to engage the second slider if the first slider is at the fifth position.

12. The opening and closing system according to claim 10, wherein the drive unit of the at least one movement unit comprises:

at least one first entraining element for connecting the first slider to the first actuator, the first actuator being configured to move the first slider by moving the at least one first entraining element, and/or at least one second entraining element for connecting the second slider to the second actuator, the second actuator being configured to move the second slider by moving the at least one second entraining element.

13. The opening and closing system according to claim 7, wherein the first portion of the roof is a front portion of the roof and the second portion of the roof is a rear portion of the roof.

14. The opening and closing system according to claim 7, comprising a cover for closing the compartment, the cover being movable between a closed position, where the compartment is inaccessible, and an open position, where the compartment is accessible.

15. The opening and closing system according to claim 14, wherein the cover comprises side walls and a covering element between the side walls, the covering element being movable between an uncovered position, where an inlet opening leading into the compartment is uncovered, and a covered position, where the opening is covered, the side walls being movable rigidly with the covering element or rotatably towards and away from the covering element to cover and uncover the opening, respectively.

16. A convertible vehicle, comprising the opening and closing system according to claim 7, and comprising the compartment.

* * * * *